United States Patent
Khalil et al.

(10) Patent No.: US 11,040,298 B2
(45) Date of Patent: Jun. 22, 2021

(54) ANTI-DRAINBACK VALVES, FLEX TUBE ASSEMBLIES INCLUDING THE SAME, AND DUAL OUTLET FLUID FILTER INCLUDING THE SAME

(71) Applicant: FILTRAN LLC, Des Plaines, IL (US)

(72) Inventors: Ibrahim A. Khalil, Lake Barrington, IL (US); Mieko Zukeran, Vernon Hills, IL (US)

(73) Assignee: FILTRAN LLC, Des Plaines, IL (US)

( * ) Notice: Subject to any disclaimer, the term of this patent is extended or adjusted under 35 U.S.C. 154(b) by 0 days.

(21) Appl. No.: 16/163,085

(22) Filed: Oct. 17, 2018

(65) Prior Publication Data

US 2019/0111361 A1 Apr. 18, 2019

Related U.S. Application Data

(60) Provisional application No. 62/573,742, filed on Oct. 18, 2017.

(51) Int. Cl.
| | |
|---|---|
| *B01D 27/10* | (2006.01) |
| *F16K 17/08* | (2006.01) |
| *F16K 15/14* | (2006.01) |
| *F16K 15/06* | (2006.01) |
| *B01D 35/027* | (2006.01) |
| *B01D 35/153* | (2006.01) |
| *F16K 1/46* | (2006.01) |

(52) U.S. Cl.
CPC ......... *B01D 27/106* (2013.01); *B01D 27/103* (2013.01); *B01D 35/0273* (2013.01); *B01D 35/153* (2013.01); *F16K 15/063* (2013.01); *F16K 15/148* (2013.01); *F16K 17/082* (2013.01); *B01D 2201/291* (2013.01); *B01D 2201/347* (2013.01); *F16K 1/465* (2013.01)

(58) Field of Classification Search
CPC ........ B01D 2201/291; B01D 2201/347; B01D 27/103; B01D 27/106; B01D 35/0273; B01D 35/153; F16K 15/063; F16K 15/148; F16K 17/082; F16K 1/465
USPC .................. 210/117, 120, 130–133, 136
See application file for complete search history.

(56) References Cited

U.S. PATENT DOCUMENTS

| | | | | |
|---|---|---|---|---|
| 2,725,076 | A | * | 11/1955 | Hansen ................. F16K 15/063 137/543.15 |
| 3,388,801 | A | | 6/1968 | Boyd et al. |
| 4,518,329 | A | * | 5/1985 | Weaver ............... F04B 53/1027 137/516.25 |
| 5,049,274 | A | | 9/1991 | Leason et al. |
| 6,116,861 | A | | 9/2000 | Hogan et al. |

(Continued)

OTHER PUBLICATIONS

International Search Report and Written Opinion from related PCT Appln. No. PCT/US2018/056283, dated Dec. 26, 2018.

*Primary Examiner* — Terry K Cecil
(74) *Attorney, Agent, or Firm* — Grossman, Tucker, Perreault & Pfleger, PLLC

(57) ABSTRACT

Anti-drainback valves, flex tube assemblies that include one or more anti-drainback valves, and fluid filters that include one or more flex tube assemblies and/or anti-drainback valves are disclosed. In embodiments the anti-drainback valves and flex tube assemblies are described in the context of their use in a multi (e.g. dual) pump fluid filter, such as a dual pump transmission fluid filter. Dual pump fluid filters including integral and separable flex tube assemblies are also described.

16 Claims, 18 Drawing Sheets

(56) References Cited

U.S. PATENT DOCUMENTS

| | | |
|---|---|---|
| 6,782,917 B2 | 8/2004 | Wolford et al. |
| 7,294,263 B2 | 11/2007 | Johnson et al. |
| 2002/0179507 A1 | 12/2002 | Wolford et al. |
| 2005/0133421 A1 | 6/2005 | Peet et al. |
| 2007/0044848 A1* | 3/2007 | Norman ................ F16K 15/063 137/542 |
| 2013/0146159 A1* | 6/2013 | Ro ........................ F16K 15/063 137/538 |
| 2014/0158594 A1 | 6/2014 | Schneider et al. |

\* cited by examiner

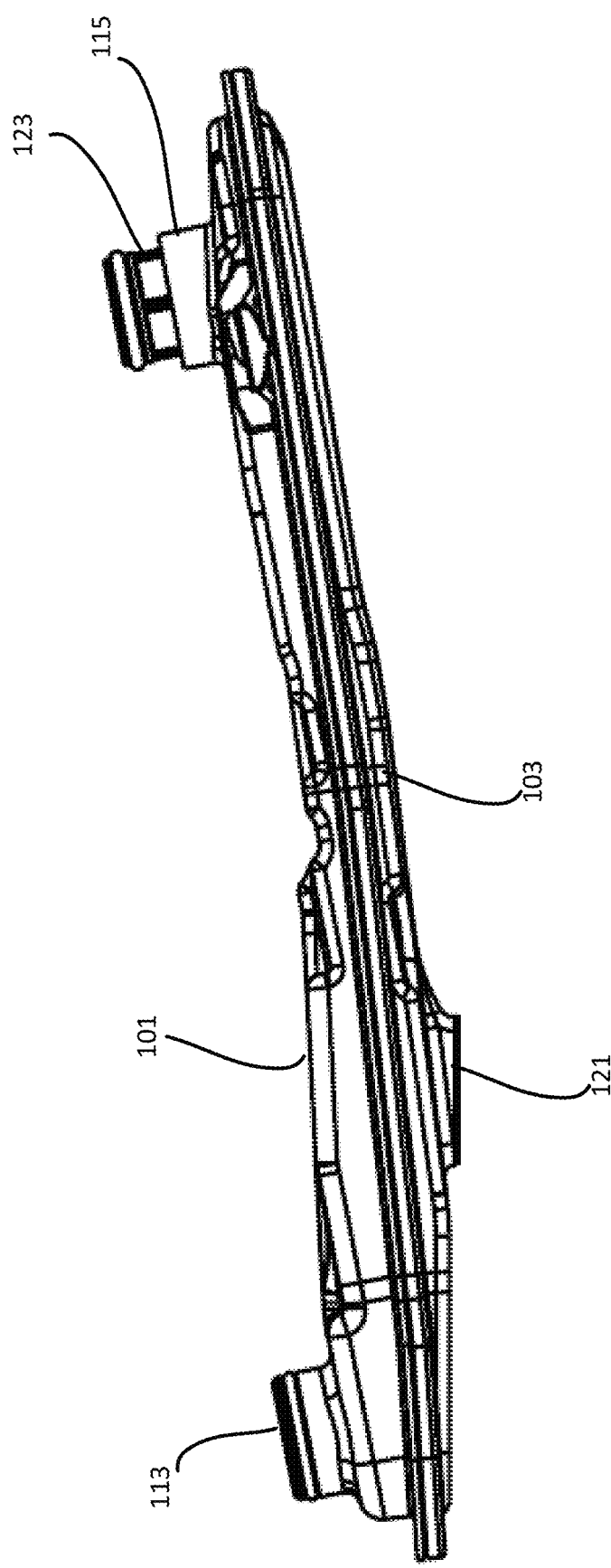

300

A

US 11,040,298 B2

ANTI-DRAINBACK VALVES, FLEX TUBE ASSEMBLIES INCLUDING THE SAME, AND DUAL OUTLET FLUID FILTER INCLUDING THE SAME

TECHNICAL FIELD

The present disclosure relates to anti-drainback valves for fluid filters, flex tube assemblies including an anti-drainback valve, and dual outlet fluid filters including an anti-drainback valve and/or a flex tube assembly including an anti-drainback valve.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

FIG. 1C is a side view of a dual outlet fluid filter consistent with the present disclosure;

DETAILED DESCRIPTION

Figure 1A:
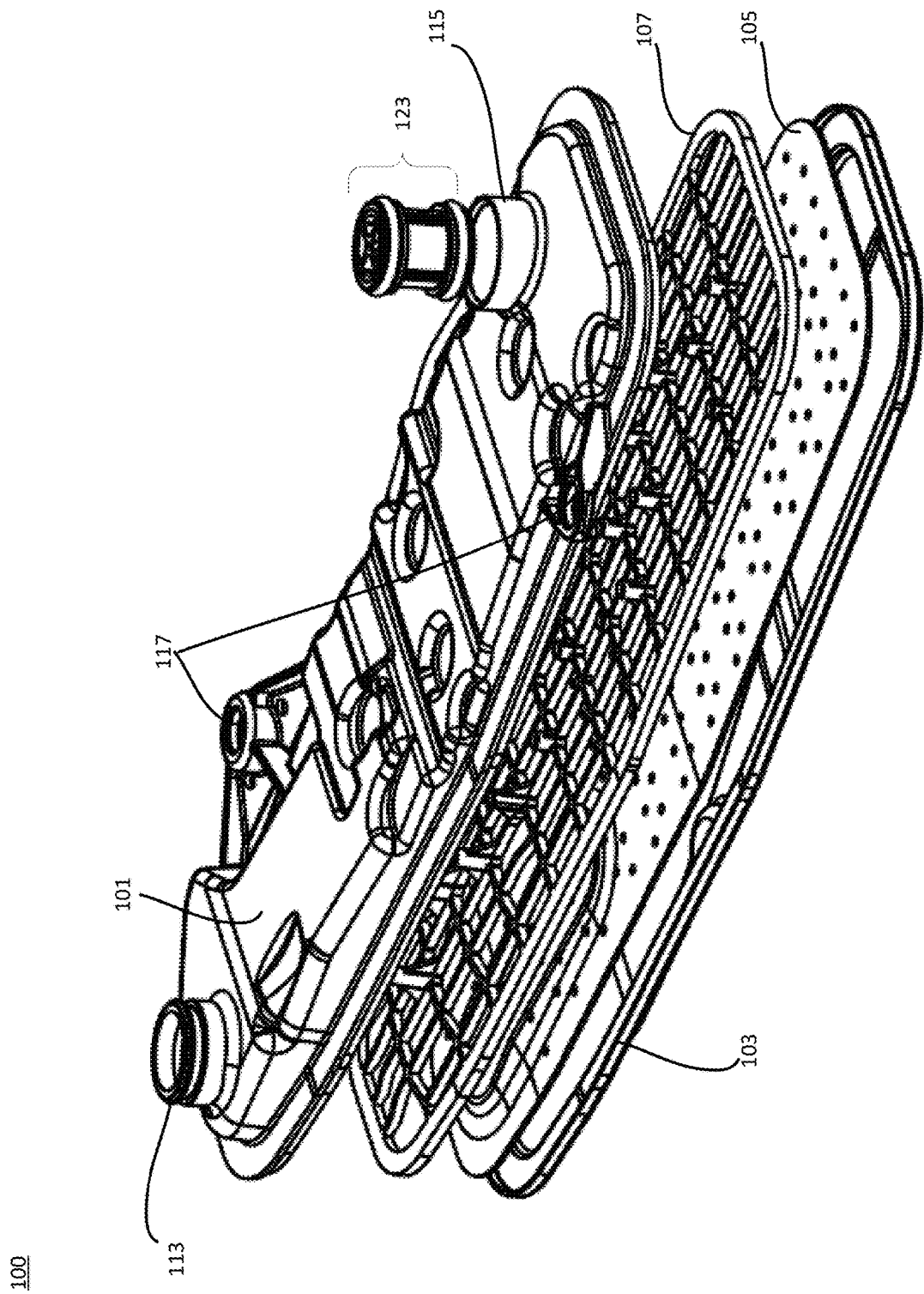
FIG. 1A is perspective exploded diagram of a dual outlet fluid filter consistent with the present disclosure.
Figure 1B:
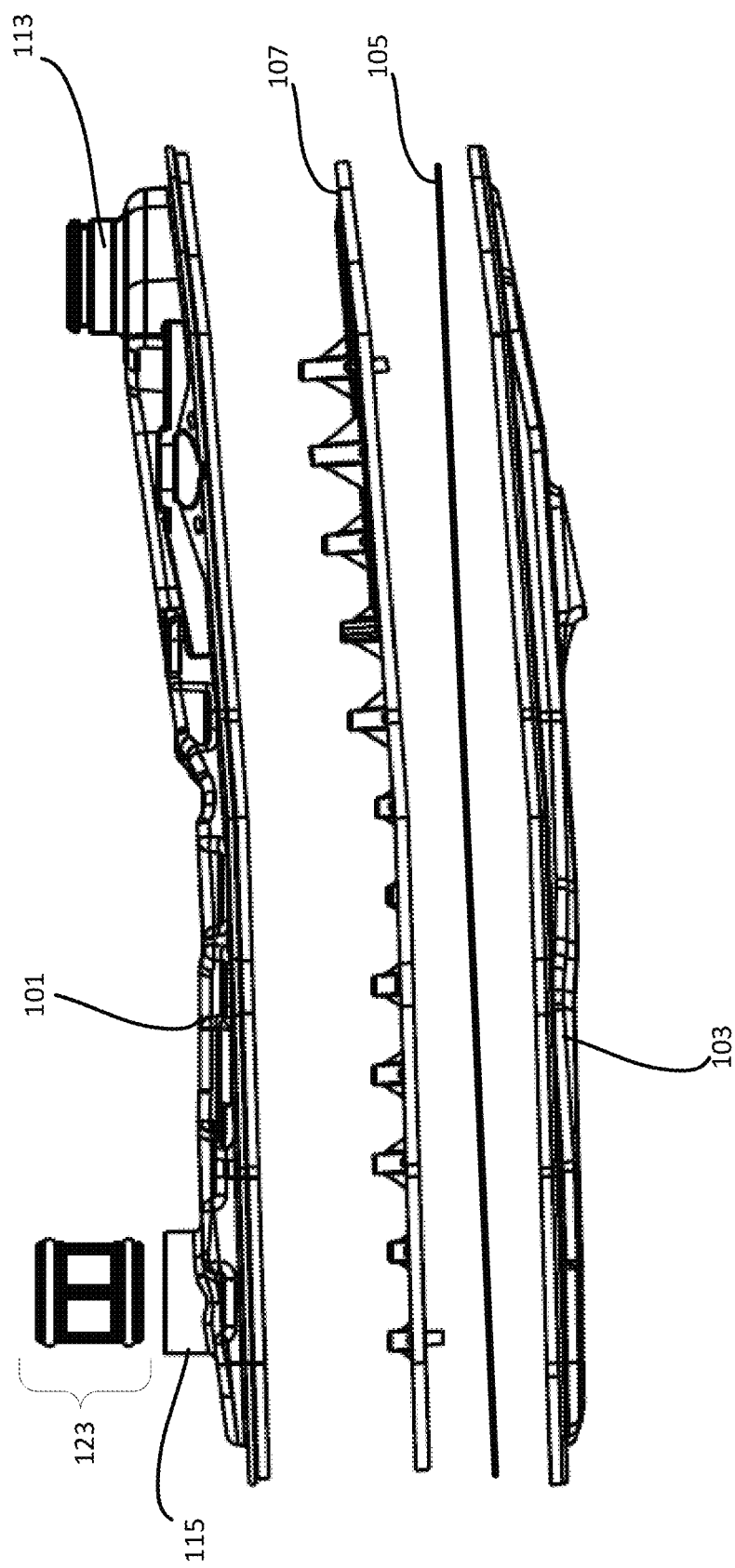
FIG. 1B is a side exploded diagram of a dual outlet fluid filter consistent with the present disclosure.

In the automotive industry, emphasis has recently been placed on the development of vehicles that are increasingly fuel efficient. As a result, automotive and other vehicle development firms have explored myriad ways to reduce the fuel consumption of a vehicle. Such efforts have led to the development and implementation of so called "start-stop" or hybrid technology, which generally functions to automatically turn the engine of a vehicle on and off under various conditions. For example, start-stop technology may automatically turn the engine of a vehicle off in response to detecting that the vehicle has come to a stop in response to the depression of a brake pedal by the vehicle operator. While the vehicle is stopped and the engine is off, a sensor may monitor for a change in pressure applied to the brake pedal. In response to a detected change in brake pressure, the start stop technology may automatically restart the vehicle's engine, at which time the operator may depress a fuel pedal to cause the vehicle to move. One benefit of start stop technology is that it can reduce the amount of fuel consumed by the vehicle while it is idling at rest.

While start stop technology can have a positive impact on fuel consumption, its implementation can result in undesirable user experiences and/or premature wear of other parts of a vehicle. For example, the transmission of many vehicles is lubricated by a transmission fluid that may be advanced through the transmission by the action of mechanical suction pump. The mechanical suction pump operates the while the vehicle's engine is on, but does not operate while the vehicle's engine is off. More specifically, while the vehicle engine is ON, the mechanical suction pump may pull transmission fluid through a transmission filter assembly, through a transmission line, and into the transmission, after which the transmission fluid may return to the transmission filter. While the engine is off, the mechanical suction pump does not operate, and transmission fluid within the transmission and/or transmission line may drain back to (pool within) the transmission filter. This can result in the presence of air bubbles in a transmission line and/or within a clutch assembly of the transmission. It may also result in a drop in transmission fluid line pressure and clutch disengagement within the transmission. This may produce an undesirable operator and/or passenger experience in vehicles that employ start stop technology, because drain back of transmission fluid may occur each time the vehicle engine is automatically turned off, potentially resulting in cavitation noise, vibration, etc. that may be felt by the vehicle operator or a passenger each time the engine is automatically turned on.

To address that issue, so-called dual pump transmission systems have been developed. Such systems may include a first transmission pump, and a second transmission pump, and a transmission filter assembly. The first transmission pump is typically a mechanical pump that is configured to advance transmission fluid from a transmission filter through the vehicle's transmission while the vehicle's engine is on. The second pump is typically an electrical pump that is configured to operate while the vehicle's engine is turned off, e.g., by start stop technology. More specifically, when the vehicle's engine is turned off (e.g., by start stop technology), the first (mechanical) transmission pump is inoperable, but the second (electric) transmission pump operates (e.g., on electric power supplied by the vehicle's electrical system) to advance transmission fluid from the transmission filter and through the transmission. Operation of the second transmission pump can maintain line pressure of transmission fluid while the vehicle's engine is automatically turned off, and thus can reduce the occurrence of cavitation, vibration, etc.

Although dual pump transmission systems can effectively reduce the occurrence of transmission fluid drain back (and its associated problems), some amount of transmission fluid drain back may still occur in such systems. For example, a dual pump transmission filter system may employ a single transmission filter that has an inlet, a first outlet, and a second outlet, where the first outlet is configured to couple to an inlet of a first (mechanical) transmission pump, and the second outlet is configured to couple to an inlet of a second (electrical) transmission pump. In some vehicles the first and second transmission pumps may be mounted such that their respective inlets are located at different heights. For example, the inlet of the first transmission pump may be located physically lower than the inlet of the second transmission pump.

due to that physical layout some dual pump transmission filter systems are configured such that a portion of the filter assembly is angled up towards the inlet of the second transmission pump. Such systems may also include a flex tube that is configured to couple the second outlet of the filter assembly to the inlet of the second transmission pump. The flex tube may also be resiliently flexible such that it may flex and move within a limited range of motion, while maintaining a fluid seal. This range of motion may be useful to address geometrical considerations (e.g., to permit assembly or service) and/or to facilitate coupling of the second outlet to the inlet of the second transmission pump. The range of motion may also address manufacturing considerations such as tolerance stackups, or for any other design reason which would make an inflexible geometry impractical. As before, the second transmission pump may operate while a vehicle's engine is off (e.g., has been automatically stopped by start stop technology) to draw (e.g., by suction) transmission fluid through the second outlet of the filter assembly, through the flex tube, and into the transmission. When the vehicle's engine is turned off for an extended period of time, however (e.g., when the vehicle is turned off by an operator), transmission fluid within the flex tube may drain back into the filter assembly, e.g., due to angling of the flex tube and/or angling of the filter assembly. This can potentially result in the formation of an air bubble within the flex tube, which in turn can produce undesirable cavitation noise and/or vibration when the second transmission pump again becomes operational. Accordingly, there remains a need for the development of improved dual pump transmission filter systems.

Aspects of the present disclosure relate to anti-drainback valves, flex tube assemblies that include one or more anti-drainback valves, and fluid filters that include one or more flex tube assemblies and/or anti-drainback valves. For the sake of illustration, anti-drainback valves and flex tube assemblies are described herein in the context of their use in a dual pump fluid filter, such as a dual pump transmission fluid filter. It should be understood, however, that the anti-drainback valves and flex tube assemblies described herein are not limited to being used in the context of a dual pump transmission fluid filter, and may be used in any other suitable application.

FIGS. 1A-1H depict various views of a dual pump fluid filter 100 consistent with the present disclosure. In embodiments the dual pump fluid filter 100 is a dual pump transmission filter, but it may be utilized in and/or adapted for other uses as mentioned above.

Figure 1D:
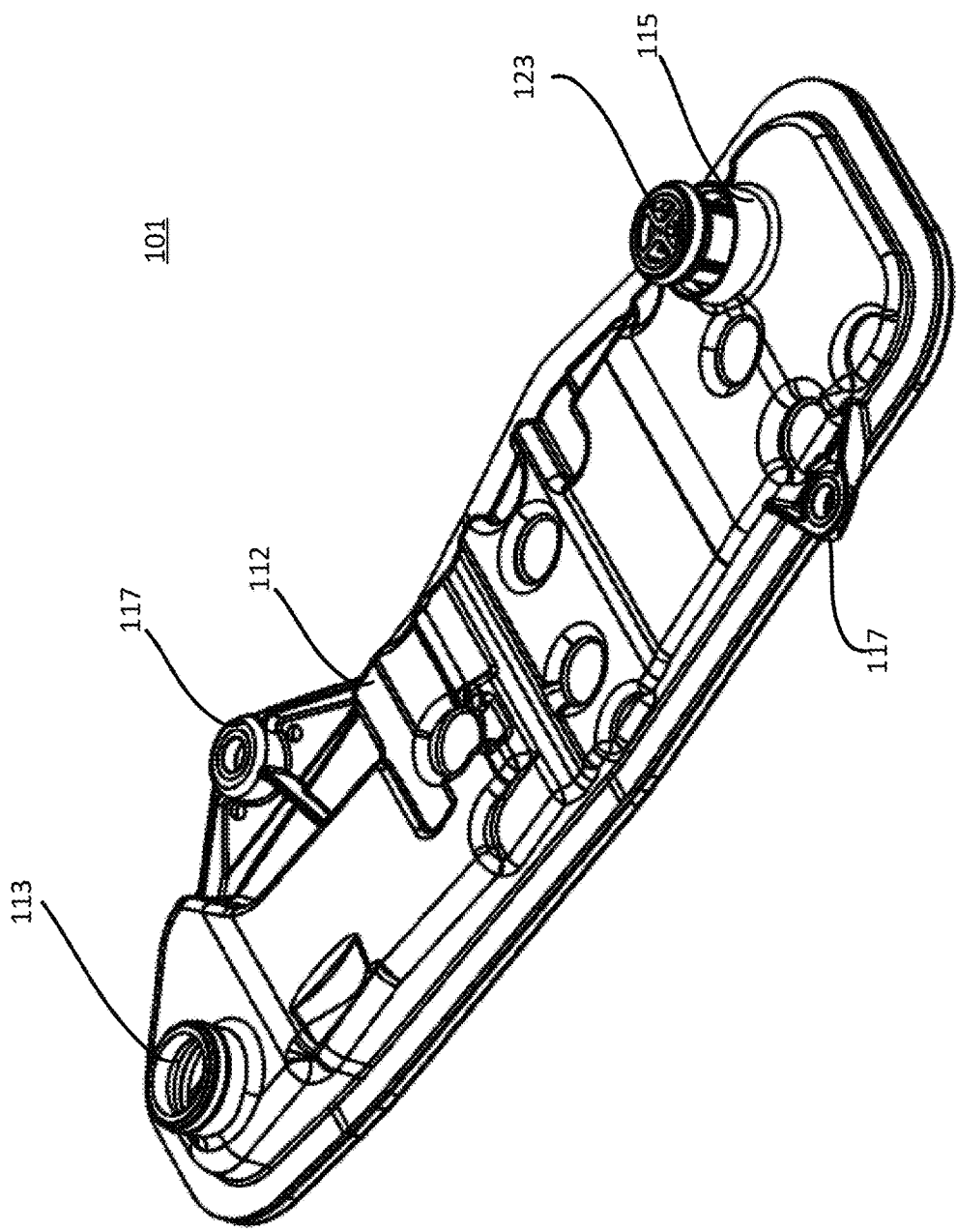
FIG. 1D is a perspective view of an upper cover of a dual outlet fluid filter consistent with the present disclosure.
Figure 1E:
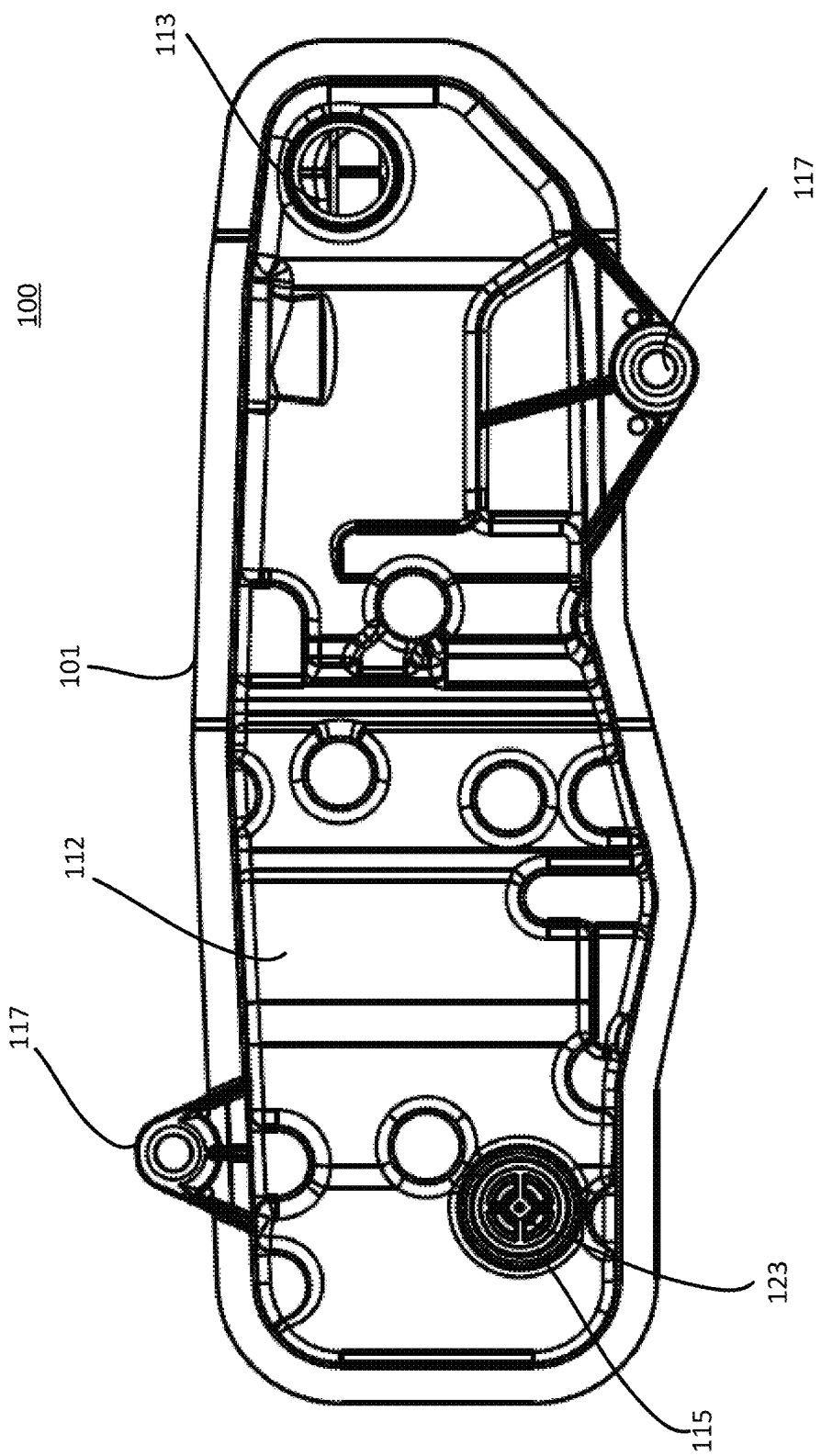
FIG. 1E is a top view of a dual outlet fluid filter consistent with the present disclosure.
Figure 1F:
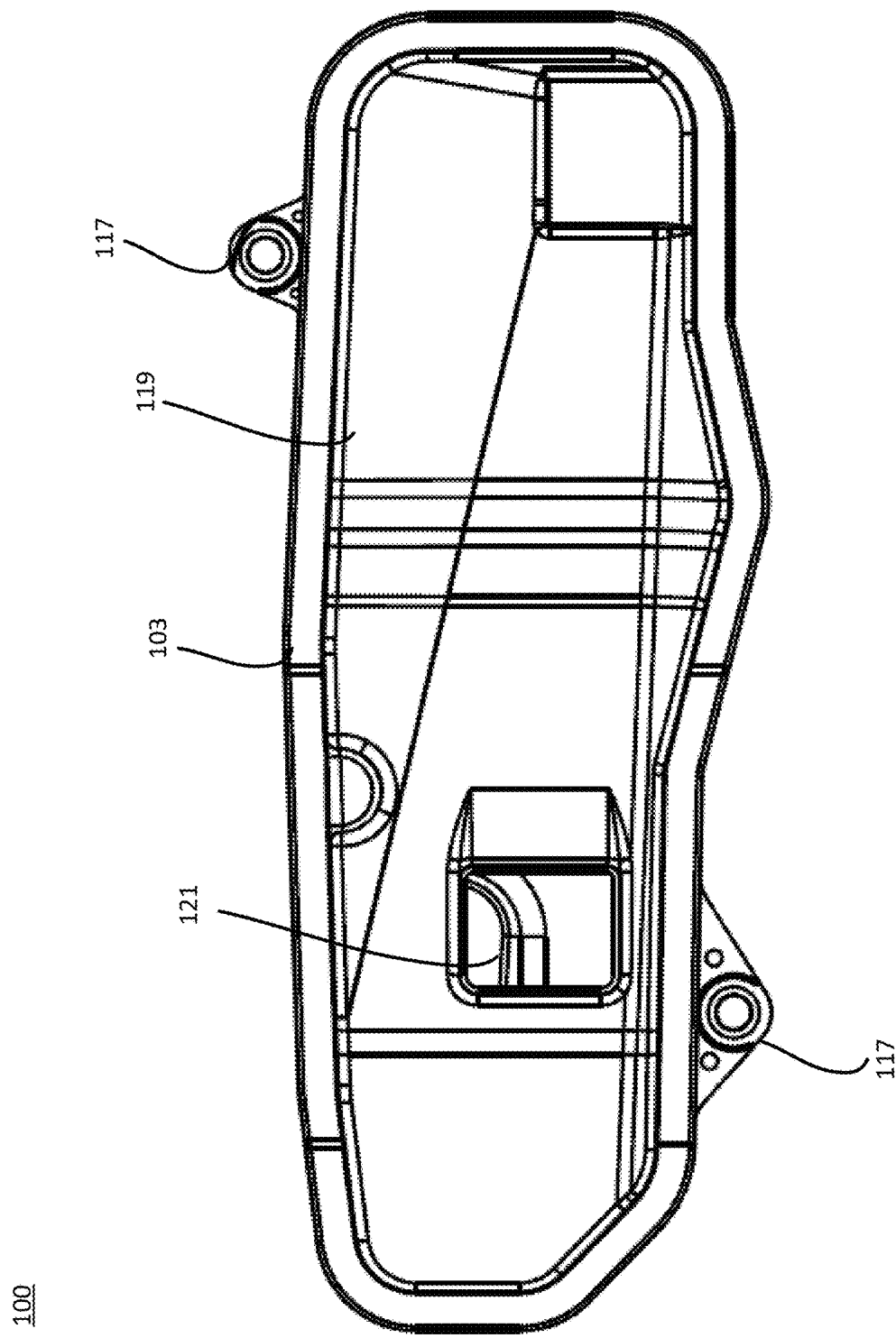
FIG. 1F is a bottom view of a dual outlet fluid filter consistent with the present disclosure.
Figure 1G:
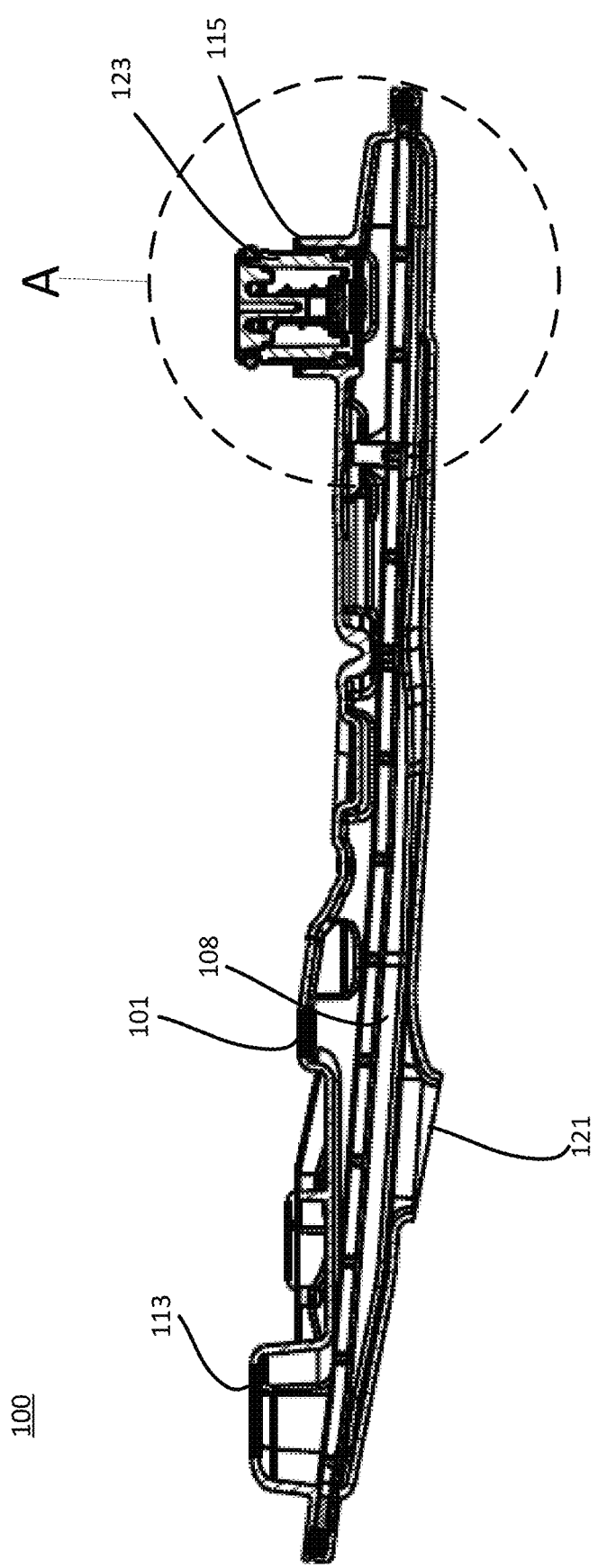
FIG. 1G is cross sectional view of a dual outlet fluid filter consistent with the present disclosure.
Figure 1H:
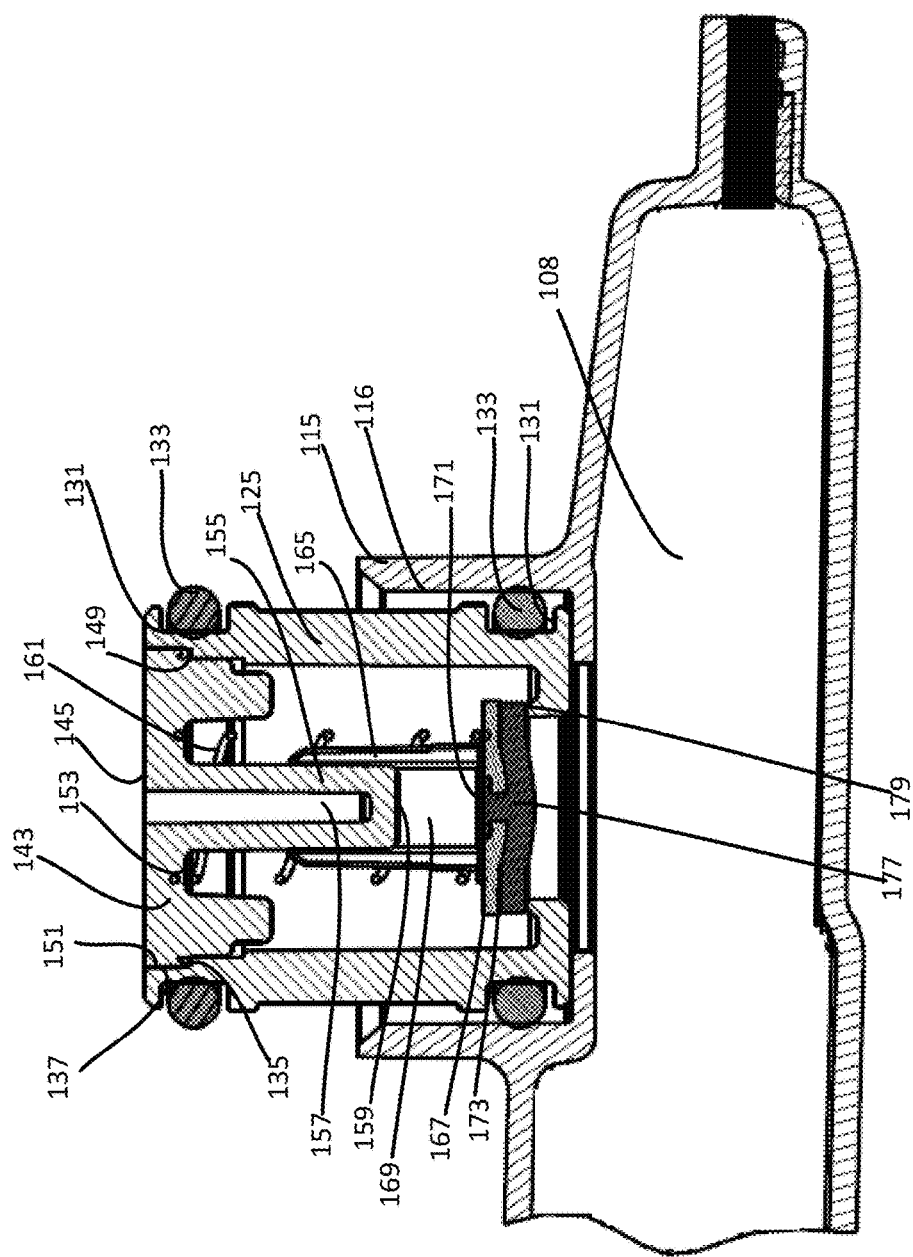
FIG. 1H is a magnified cross-sectional view of region A of FIG. 1G.

Fluid filter 100 includes an upper cover 101, a lower cover 103, a filter medium 105, and an optional screen assembly 107. As shown in FIGS. 1D, 1E, and 1F, the upper cover 101 includes an upper cover body 112 and the lower cover 103 includes a lower cover body 119. As best shown in FIGS. 1C, 1G, and 1H, the upper cover 101 and lower cover 103 may be joined to one another, such that a cavity 108 is present between the inner surface of the upper cover 101 and the inner surface of the lower cover 103. More specifically, peripheral flanges (not labeled) of the upper cover body 112 and the lower cover body 119 may be coupled to one another via welding (e.g., laser welding), crimping, adhesive, one or more fasteners, or the like. The filter medium 105 is disposed within the cavity 108 formed by the upper and lower covers 101, 103. Coupling of the upper and lower covers 101, 103 is such that a fluid impermeable seal is present around the periphery of the filter assembly 100, enabling fluid (e.g., oil, transmission fluid, or the like) to be passed through the filter assembly 100 without leaking.

As best shown in FIGS. 1C-1F, the lower cover 103 includes an inlet 121 and the upper cover 101 includes a first outlet 113 and a second outlet 115. The first outlet 113 is configured to couple or be coupled to a first fluid pump (not shown), such a mechanical transmission pump. The second outlet 115 is configured to couple or be coupled to a second fluid pump (not shown), such as an electrical transmission pump. The upper cover 101 further includes coupling members 117, which are configured to facilitate mounting of the filter assembly 100 to a vehicle or component of a vehicle. Coupling members 117 may be grommets, O-Rings, threaded openings, or any other mechanism that is suitable for mounting filter assembly 100 to a vehicle or a vehicle component.

In embodiments and as shown in various FIGS, filter assembly 100 may include a flex tube assembly 123. The flex tube assembly 123 may be permanently or detachably coupled to the coupled to the second outlet 115. The flex tube assembly 123 is generally configured to facilitate coupling of the filter assembly 100 to the second fluid pump, and will be described in further detail below.

In operation, the first fluid pump functions to draw (via suction or another force) fluid into the inlet 121, through the filter media 105, and through the first outlet 113. Operation of the first fluid pump may be conditioned on a vehicle engine being in a first operating state, such as an on (running) state. In contrast, the second fluid pump functions to draw (via suction or another force) fluid into the inlet 121, through the filter media 105, and through the second outlet. Operation of the second fluid pump may be conditioned on a vehicle engine being in a second operating state, such as an off (non-running) state. The second operating state may be a transient (temporary) off state that is instigated by start stop technology of a vehicle in which the engine and filter assembly 100 are installed.

Figure 2A:
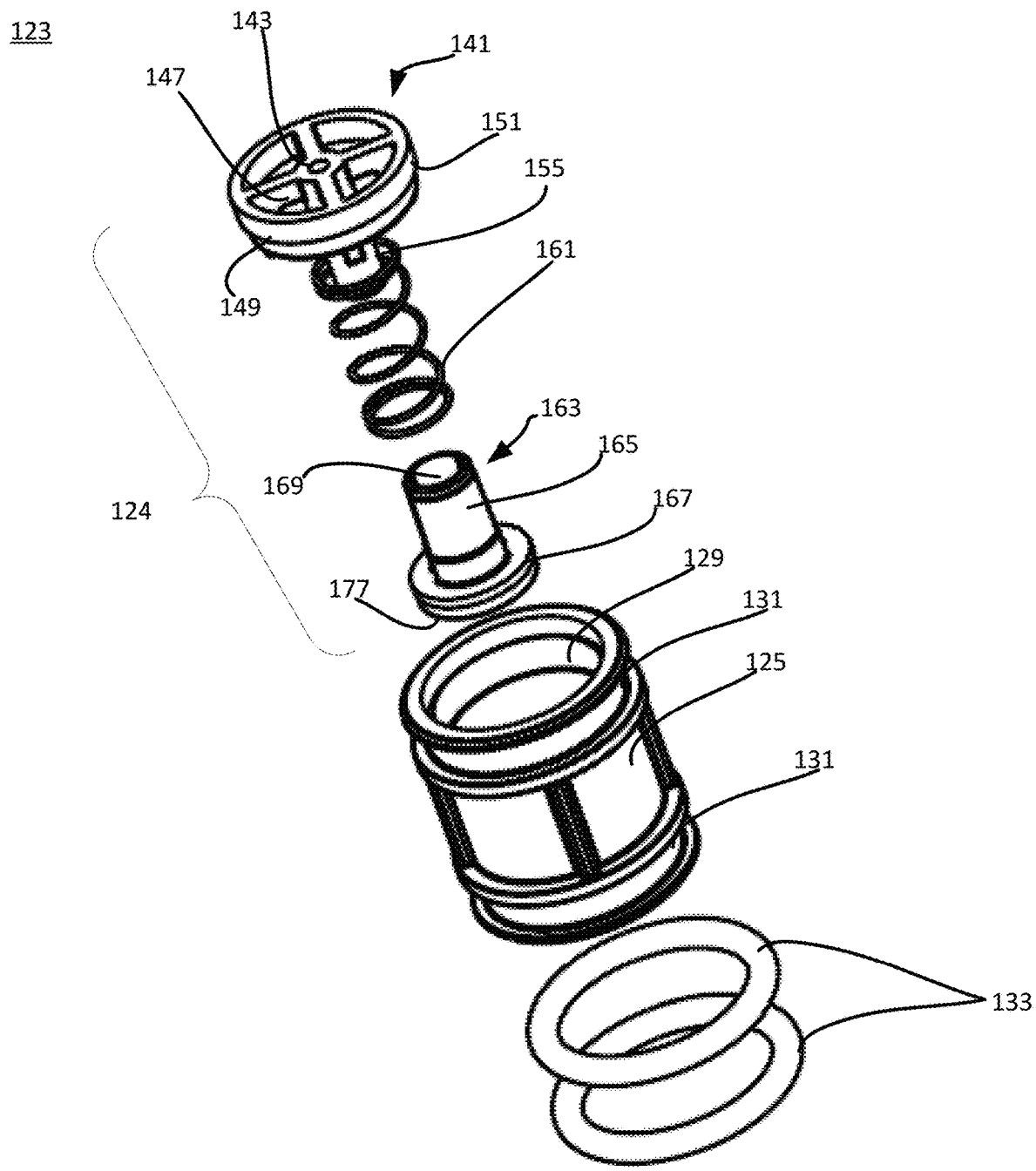
FIG. 2A is a perspective exploded view of a flex tube assembly consistent with the present disclosure.
Figure 2B:
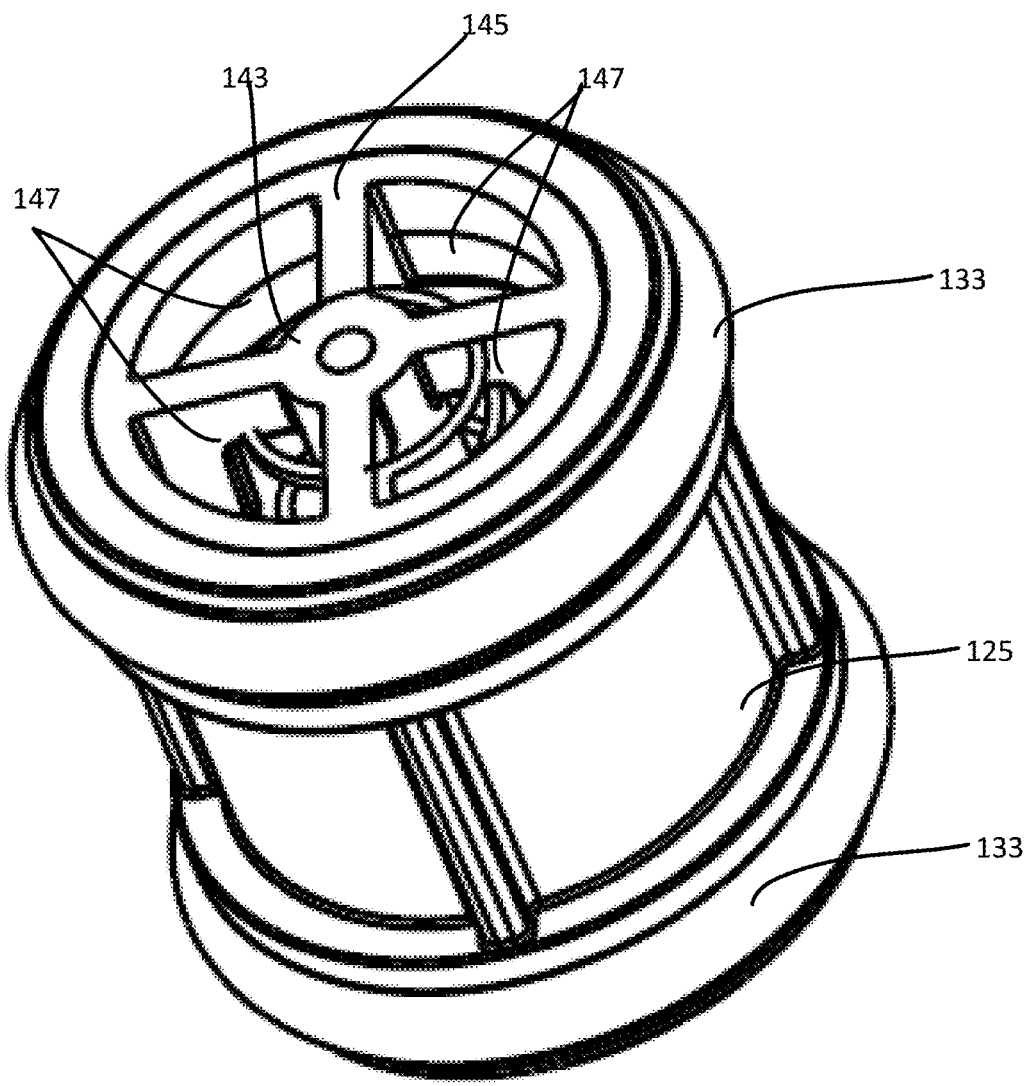
FIG. 2B is a perspective view of the top of a flex tube assembly consistent with the present disclosure.
Figure 2C:
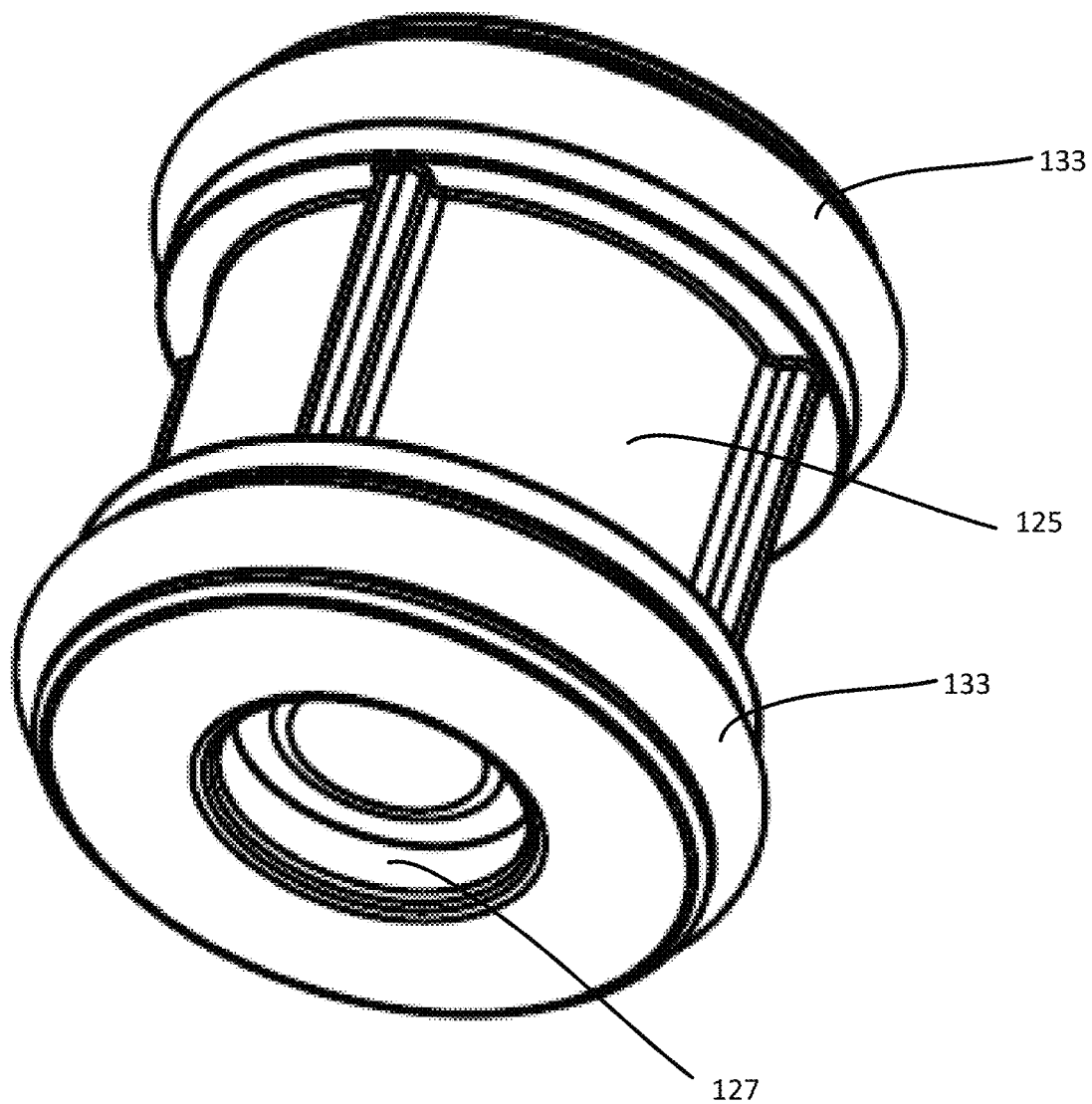
FIG. 2C is a perspective view of the bottom of a flex tube assembly consistent with the present disclosure.

FIGS. 2A-2E present various view of one example of a flex tube assembly 123. As best shown in FIGS. 2A and 2C, flex tube assembly 123 includes a flex tube body 125 having a proximal opening 127 (relative to upper cover 101) and a distal opening 129. In the illustrated embodiments the proximal opening 127 is smaller than the distal opening 129, but the size and configuration of such openings may be adjusted based on a particular application and/or to attain a desired fluid flow through the flex tube assembly 123.

The flex tube body 125 includes outer grooves 131, which are configured to receive sealing members 133 (e.g., O-rings). As shown in various FIGS, sealing members 133 may be seated in outer grooves 131, and are generally configured to facilitate coupling of the flex tube assembly 125 to the second outlet 115. For example, and as best shown in FIG. 1H, at least one of the sealing members 133 may be configured to be compressed between an inner surface of a sidewall 116 of the second outlet 115 and a surface of flex tube body 125 within at least one outer groove 131, so as to form a fluid impermeable seal. Flex tube body 125, grooves 131, sealing members 133, and the sidewall 116 of second outlet 115 may be configured to allow flex tube assembly 123 to move within a limited range of motion, while retaining the fluid impermeable seal. In that way, the position of flex tube body 125 may be adjusted to facilitate coupling of the flex tube assembly with an inlet of a second (electronic) fluid pump, and/or a conduit leading to an inlet to an inlet of a second fluid pump. Of course, the use of sealing members 133 and outer grooves 131 is for the sake of example only, and flex tube assembly 123 may be coupled to a fluid outlet in any suitable manner.

Figure 2D:
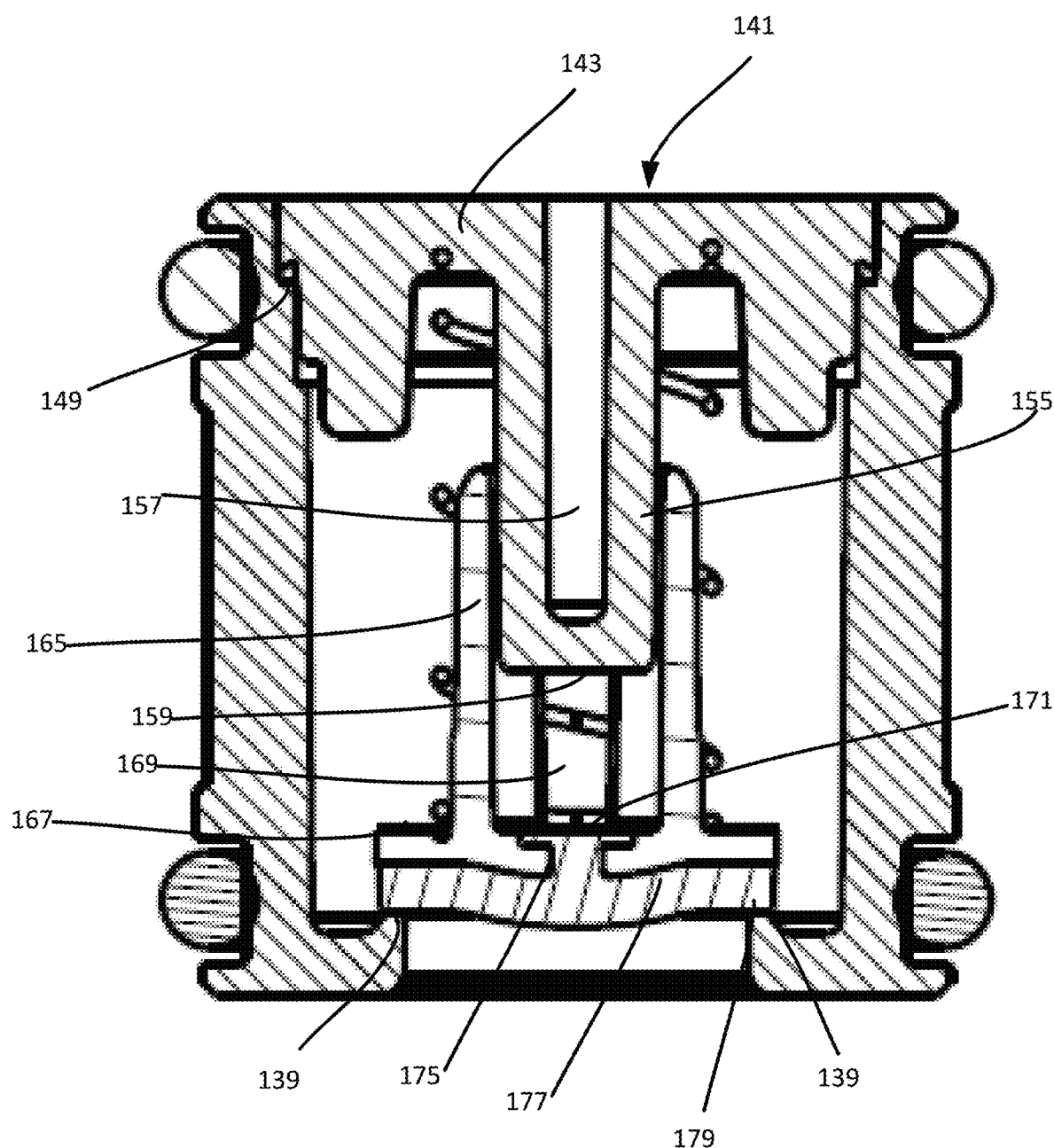
FIG. 2D is a cross sectional diagram of a flex tube assembly including a anti-drainback valve in a closed position, consistent with the present disclosure.

As best shown in FIGS. 1H, 2A, and 2D, the flex tube assembly 123 further includes an anti-drainback valve assembly 124. The anti-drainback valve assembly 124 includes a cap 141, a biasing member 161, a piston 163, and a valve seat 177. In general, and as will be further described below, the anti-drainback valve assembly 124 is configured to transition from a closed position to an open position. When the anti-drainback valve assembly 124 is in the closed position, fluid flow through the flex tube assembly 123 (and, hence, second outlet 115) is prevented in either direction. In contrast, when anti-drainback valve assembly 124 is in the open position, fluid may flow through the flex tube assembly 123 (and, hence, second outlet 115). In embodiments and as will be described below, the anti-drainback valve assembly 124 is configured such that it is in the open position when a second (electronic) fluid pump is operational (on), and is in the closed position when the second fluid pump is not operational (off).

As best shown in FIGS. 1H, 2A, and 2B, cap 141 includes a cap body portion 143, a cap upper surface 145, and cap openings 147. The cap body portion 143 includes a cap lower surface 149, which is configured to abut a first cap abutment surface 135 of flex tube body 125. The cap body portion 143 further includes a circumferential surface 151, which is configured to abut a second cap abutment surface 137 of flex tube body 135. In embodiments and as best shown in FIGS. 1H and 2D, the first and second cap abutment surfaces 135, 137 of flex tube body 125 may be in the form of a side and lower surfaces of a shoulder formed in an inner surface of flex tube body 125. In such instances, the first cap abutment surface 135 may be configured to abut the lower surface (first cap abutment surface 135) of the shoulder, and the circumferential surface 151 may be configured to abut the side surface (second cap abutment surface 137) of the shoulder. In any case, the cap 141 may be fixedly coupled to the flex tube body by an adhesive, a weld, or other suitable fixing means.

As further shown in various FIGS., cap 141 includes an engagement surface 153 and a stem 155. In general, the engagement surface 153 is configured to engage biasing member 161, which in the illustrated embodiments is shown in the form of a spring that is disposed around stem 155, with an upper portion of the spring abutting engagement surface 153. Such illustration is for the sake of example only, and any suitable type of biasing member may be used, such as but not limited to a weight.

In embodiments and as shown in various FIGS. stem 155 includes one or more optional openings 157. When used, the openings 157 may facilitate the flow of fluid through the anti-drainback valve assembly 124 (and, hence, flex tube assembly 123). The number and configuration of the openings 157 may be varied based on particular application, and may be omitted. For example, the size and configuration of openings 157 may be configured so as to avoid undesirable buildup of backpressure within the flex tube assembly 123 when the anti-drainback valve assembly 124 is in the open position. Likewise, the number, size, and configuration of openings 147 may be selected based on a desired application, and/or to avoid buildup of backpressure within the flex tube assembly 123 when anti-drainback valve assembly 124 is in the open position.

As shown in FIGS. 1H, 2A, 2D, and 2E, anti-drainback valve assembly 124 further includes a piston 163 and a valve seat 177. The piston 163 includes a piston upper body 165 and a piston flange 167. In the illustrated embodiments the piston upper body 165 has a generally cylindrical shape with a sidewall (not labeled) that defines a piston cavity 169. Such a configuration is for the sake of example only, and any suitable piston shape may be used. In any case, the piston cavity 169 is configured to receive at least a portion of the stem 155 of cap 141 therein. As further shown, a portion of the biasing member 161 is disposed around an outer surface of the piston upper body 165, and abuts piston flange 167. The valve seat 177 abuts a bottom surface 173 of piston flange 167 and is coupled to the piston 163.

Figure 2E:
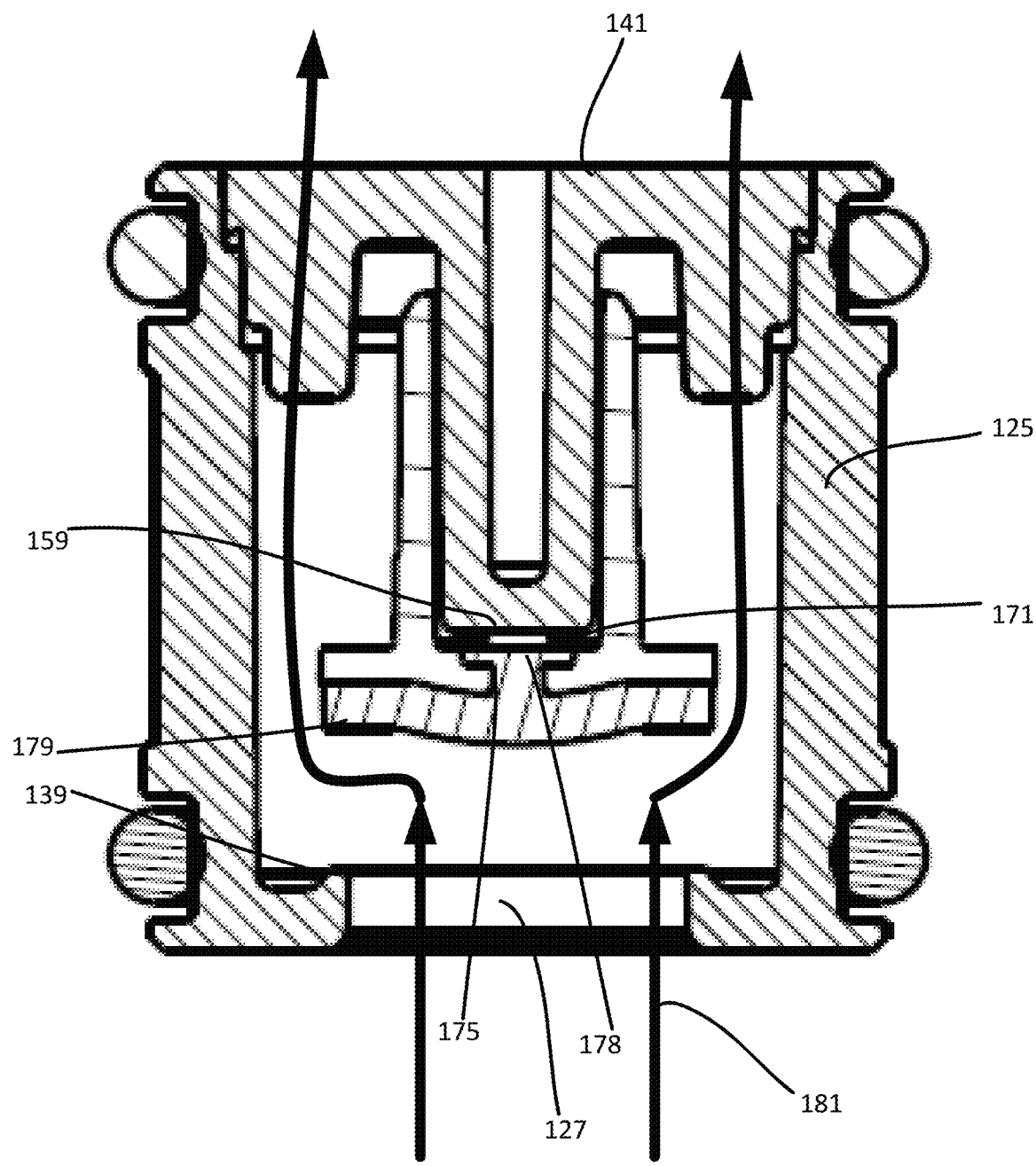
FIG. 2E is a cross sectional diagram of a flex tube assembly including a anti-drainback valve in an open position, consistent with the present disclosure.

For example, and as shown in the illustrated embodiments, the valve seat 177 may be coupled to the piston 163 via a notch 175, as best shown in FIGS. 2D and 2E. For example, the valve seat 177 may include a protuberance 178 that is configured to extend through notch 175, so as to create an interference fit between valve seat 177 and piston 163. Of course, such illustration is for the sake of example only, and the valve seat 177 may be coupled to the piston 163 in any suitable manner, such as by an adhesive, a weld, a mechanical fastener, or the like.

When flex tube assembly is assembled, biasing member 161 imparts a biasing force against engagement surface 153 of cap 141 and piston flange 167. The biasing force causes the piston 163 to urge at least a portion of the valve seat 177 against a valve abutment surface 139 of flex tube body 125. For example, the biasing force may cause the piston 163 to urge a seat sealing surface 179 of the valve seat 177 against valve abutment surface 139. Urging of the valve seat 177 against valve abutment surface 139 creates a seal that closes proximal opening 127 and prevents a flow of fluid through the flex tube assembly 123. In such a configuration the flex tube assembly 123 (or, more specifically, the anti-drainback valve assembly 124) is in a closed state, and a gap 169 is present between a stopping surface 159 of the stem 155 and a bottom 171 of the piston cavity 169.

When flex tube assembly 123 is used in connection with a fluid filter assembly such as fluid filter assembly 100, the biasing force applied by the biasing member 161 may cause the anti-drainback valve assembly 124 therein to remain in a closed state when a second (electronic) fluid pump is not in operation (i.e., is off). However, when the second fluid pump is in operation (on), the second fluid pump may apply a suction force to the anti-drainback valve assembly 124 that is greater than the biasing force applied by the biasing member 161. Under such conditions, the piston 163 may travel along the stem 155, to disengage the seat sealing surface 179 of the valve seat 177 from the valve abutment surface 137 of the flex tube body 125 and open proximal opening 127. In such a condition, the anti-drainback valve assembly 124 is in an open state.

As best shown in FIG. 2E, the suction force applied by the second fluid pump may cause the piston 163 to travel along the stem 155 until the bottom 171 of the piston cavity 169 abuts the stopping surface 159 of the stem 155. When the second fluid pump is disabled (turned off) or the suction force applied by the second fluid pump is less than the biasing force applied by the biasing member 161, the piston 163 may travel along the stem 155 until seat sealing surface 179 of the valve seat 177 engages valve abutment surface 139, thereby returning the anti-drainback valve assembly 124 to a closed state. As will be appreciated, such action allows the anti-drainback valve assembly 124 to maintain the prime of a first pump that is coupled to the outlet in which the anti-drainback valve assembly is disposed. Moreover, the anti-drainback valve assembly can reduce the probability that the operation of a second pump attached to another outlet of the filter (e.g., which may not be protected by an anti-drainback valve assembly) will cause a loss of fluid flow to an inlet of the first pump.

As may be appreciated from the foregoing, the flex tube assemblies and anti-drainback valve assemblies described herein can function to limit or eliminate the generation of an air pocket in dual pump fluid filter system, particularly when such a system is used in a vehicle employing start stop technology. For example, and consistent with the foregoing discussion, when an engine of a vehicle employing start stop technology is on (running), a first (mechanical) pump coupled to the first fluid outlet 113 may cause fluid to flow through the inlet 121, through the filter medium 105, through optional screen assembly 107, and through the first outlet 113. At that time, the anti-drainback valve assembly 124 in a flex tube assembly 123 may be in a closed state, and thus may prevent the forward or backward flow of fluid through the second fluid outlet 115. When the start stop technology of the vehicle causes the vehicle's engine to turn off, the first pump will turn off, and the second pump (coupled to the second outlet 115 via flex tube assembly 123) will turn on. As discussed above, the second pump can apply a suction force to the anti-drainback valve assembly 124 that exceeds the biasing force applied by biasing member 161, causing the piston 163 to travel along the stem 155 and open the proximal opening 127 of the flex tube body 125, placing the anti-drainback valve assembly 124 into an open state. As shown in FIG. 2E, in the open state a fluid flow 181 can flow around the valve seat 177, into a cavity (not labeled) of the flex tube assembly 132, and through the openings 147 in cap 141. When the second fluid pump is turned off, the biasing member 161 urges the piston 163 against the valve seat 177 until the valve sealing surface 179 engages the valve abutment surface 139 of flex tube body 125, thereby closing proximal opening 127 and preventing backflow of fluid through proximal opening 127.

The foregoing description focuses on example embodiments of a flex tube assembly that may be coupled to a fluid filter, and dual outlet fluid filter assemblies that include a flex tube assembly that is coupled to one or both outlets thereof. Such embodiments are for the sake of example only, and it should be understood that the flex tube assemblies described herein need not be provisioned as a separate component from a fluid filter. Indeed, the present disclosure encompasses embodiments in which a flex tube assembly is integral (i.e., unitary) with one or more outlets of a fluid filter. For example, embodiments of the present disclosure relate to a dual outlet fluid filter assembly that includes at least one outlet (e.g., a first outlet and second outlet), wherein a flex tube assembly forms part of or is otherwise integral with the at least one outlet (e.g., both outlets). For example, and as will be described below, a sidewall of the at least one outlet may form all or a portion of a flex tube body, as previously described. As previously described, an anti-drainback valve may be disposed within the sidewall/flex tube body, and may function to hinder or prevent a back flow of fluid through the at least one outlet.

In that regard reference is made to FIGS. 3A-3E, which depict one example embodiment of a dual outlet fluid filter that includes an integral flex tube assembly consistent with the present disclosure. As shown, fluid filter assembly 300 includes an upper cover 101 and a lower cover 103, wherein the upper cover 101 includes first and second outlets 113, 115, and the lower cover 103 includes an inlet 121. As can be seen, fluid filter assembly 300 includes many of the same elements as the fluid filter assemblies discussed above. As the nature and function of such elements are the same as previously described, that description is not reiterated in the interest of brevity.

Figure 3A:
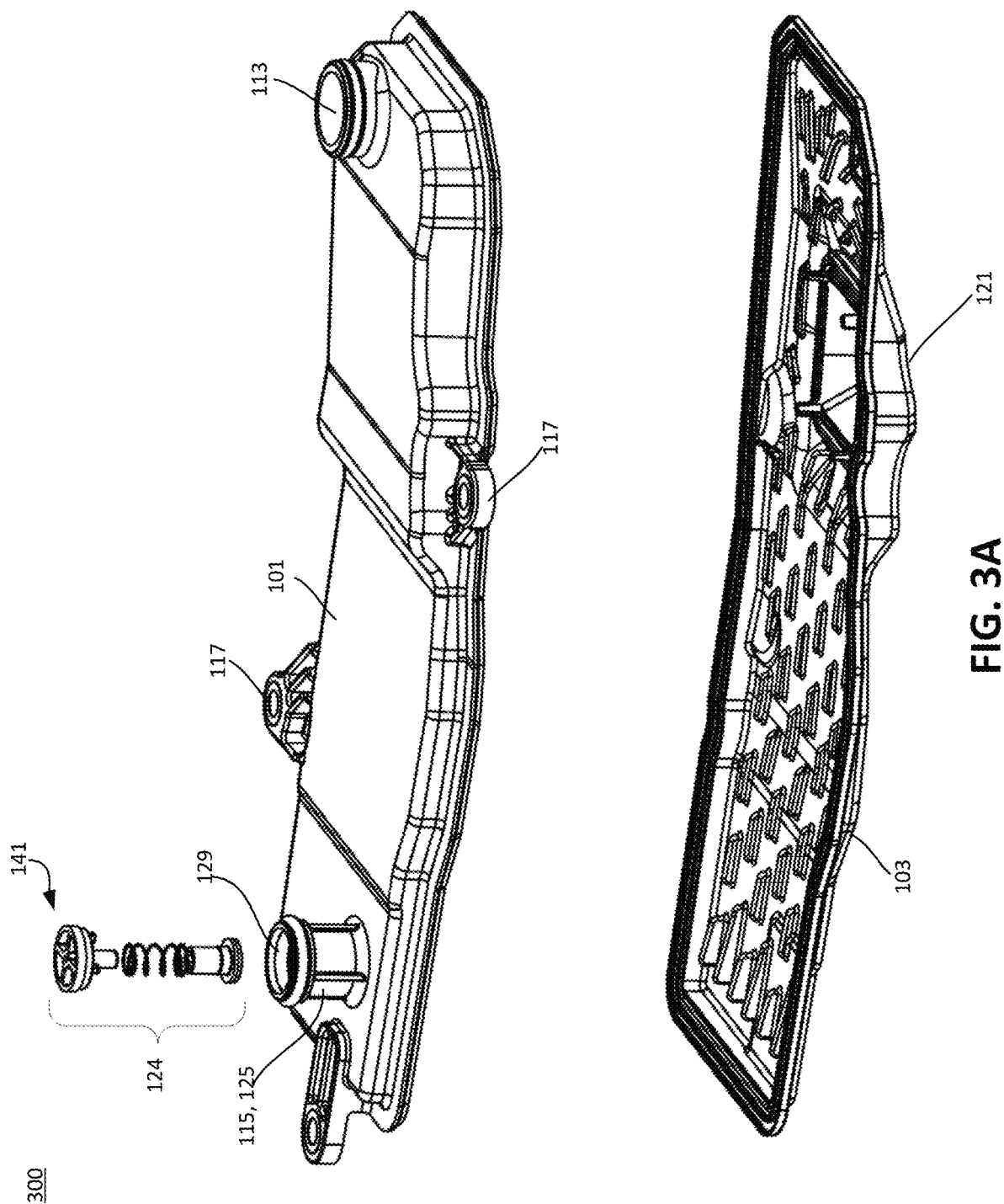
FIG. 3A is an exploded view of another example of a dual outlet fluid filter including a anti-drainback valve consistent with the present disclosure.
Figure 3B:
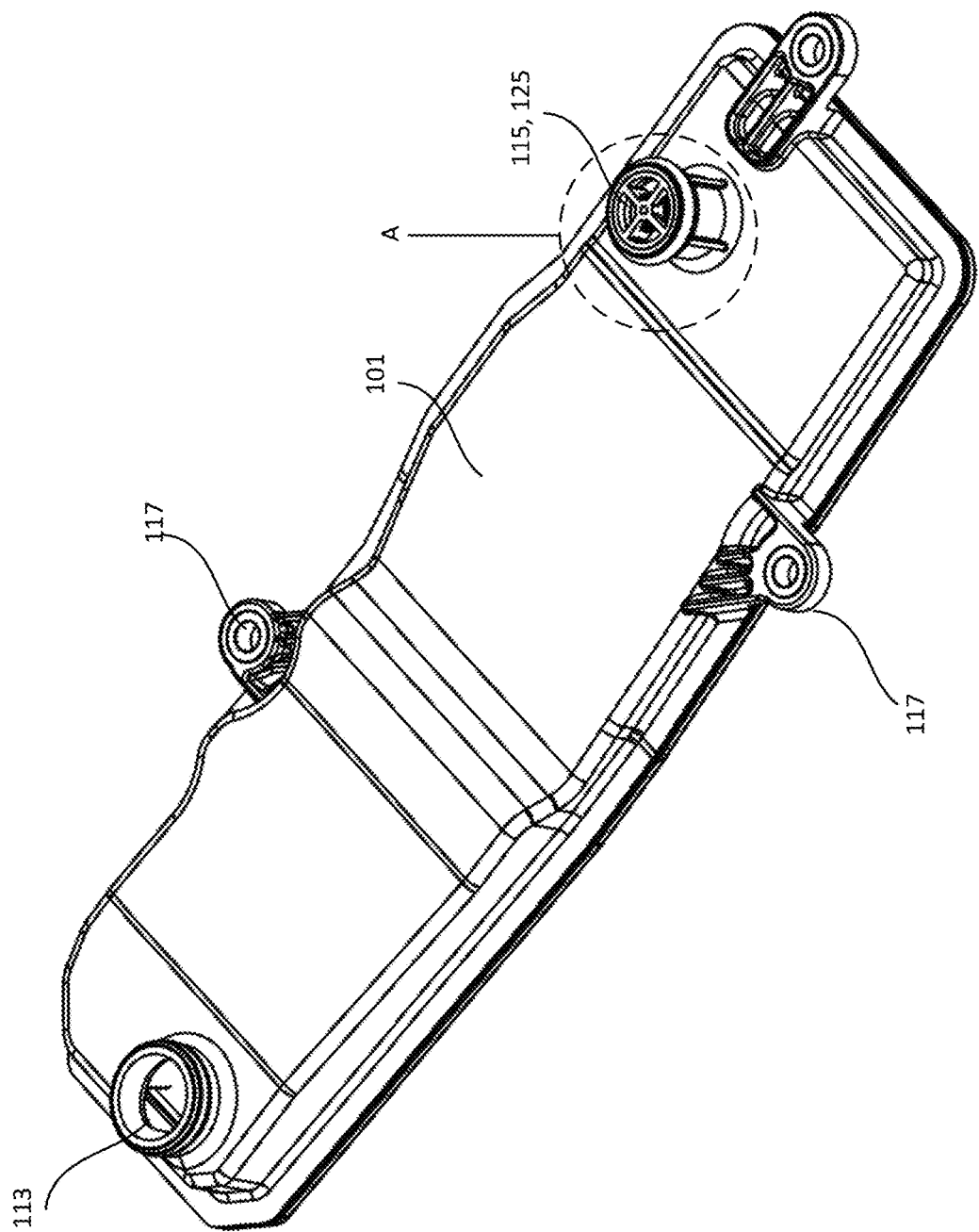
FIG. 3B is a perspective view of part of the dual outlet fluid filter of FIG. 3A.
Figure 3C:
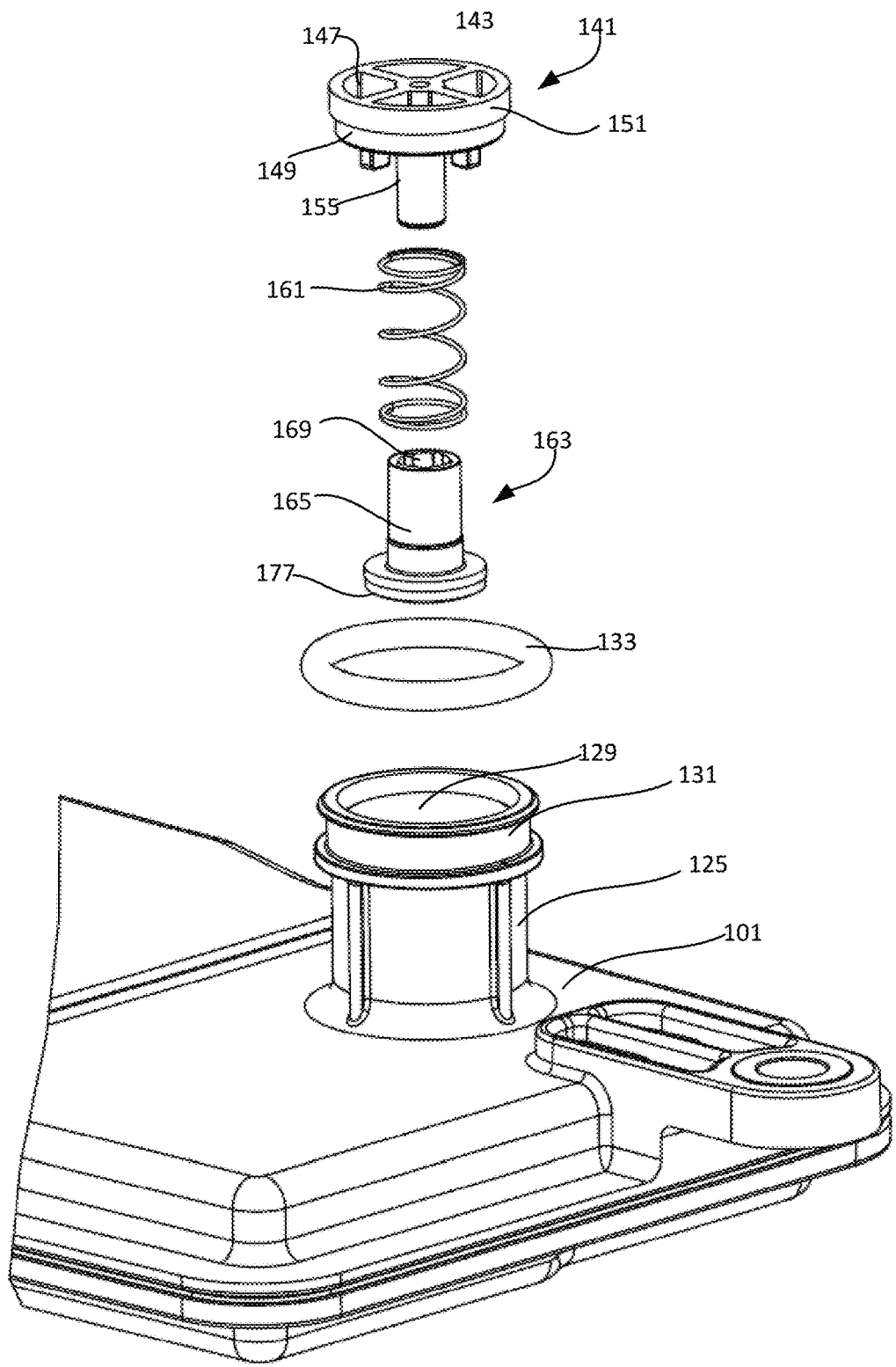
FIG. 3C is a magnified exploded view of an example anti-drainback valve used in the embodiment of FIG. 3A.
Figure 3D:
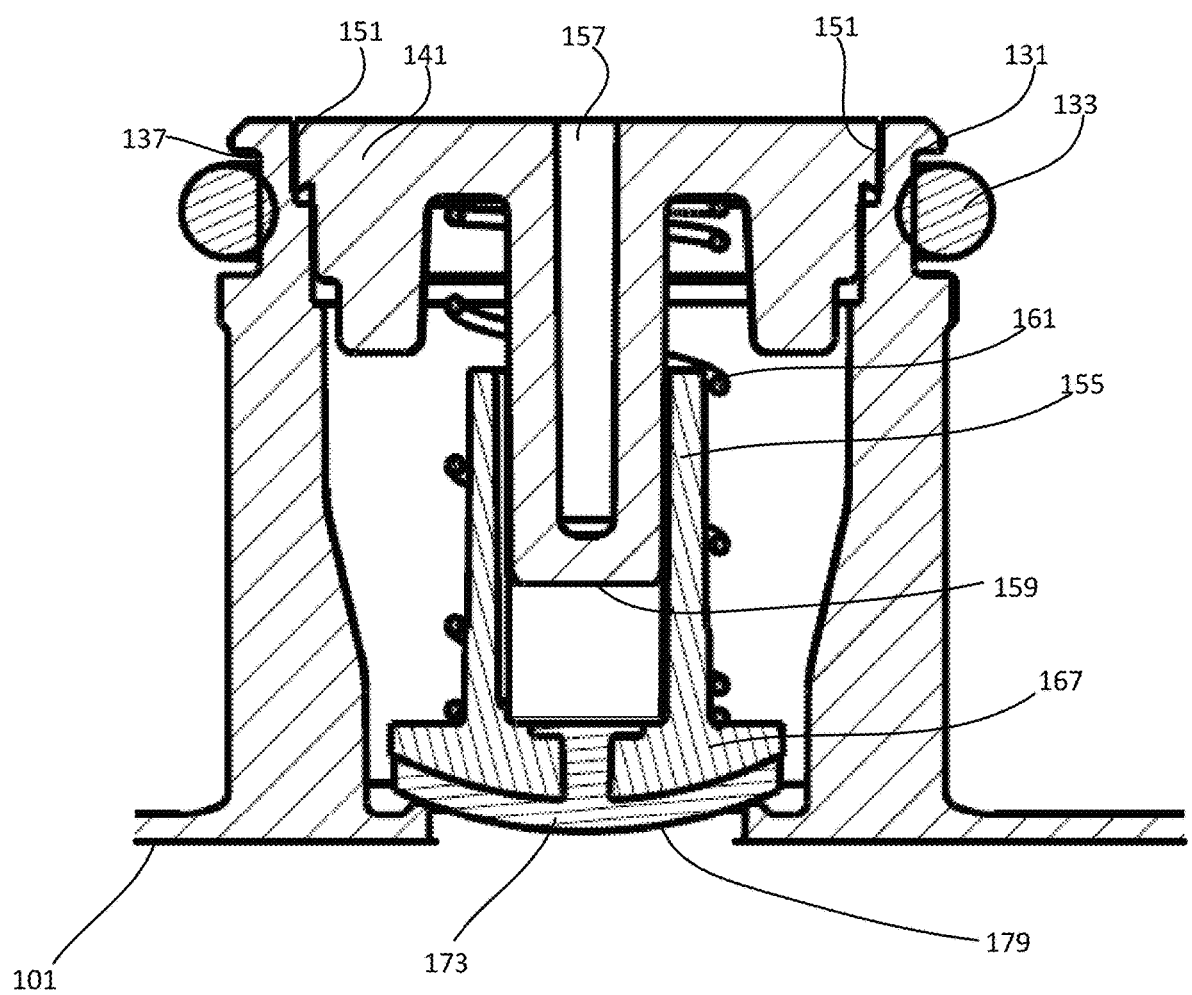
FIG. 3D is a side cross-sectional diagram of the anti-drainback valve of the embodiments of FIGS. 3A-3C, in a closed state.
Figure 3E:
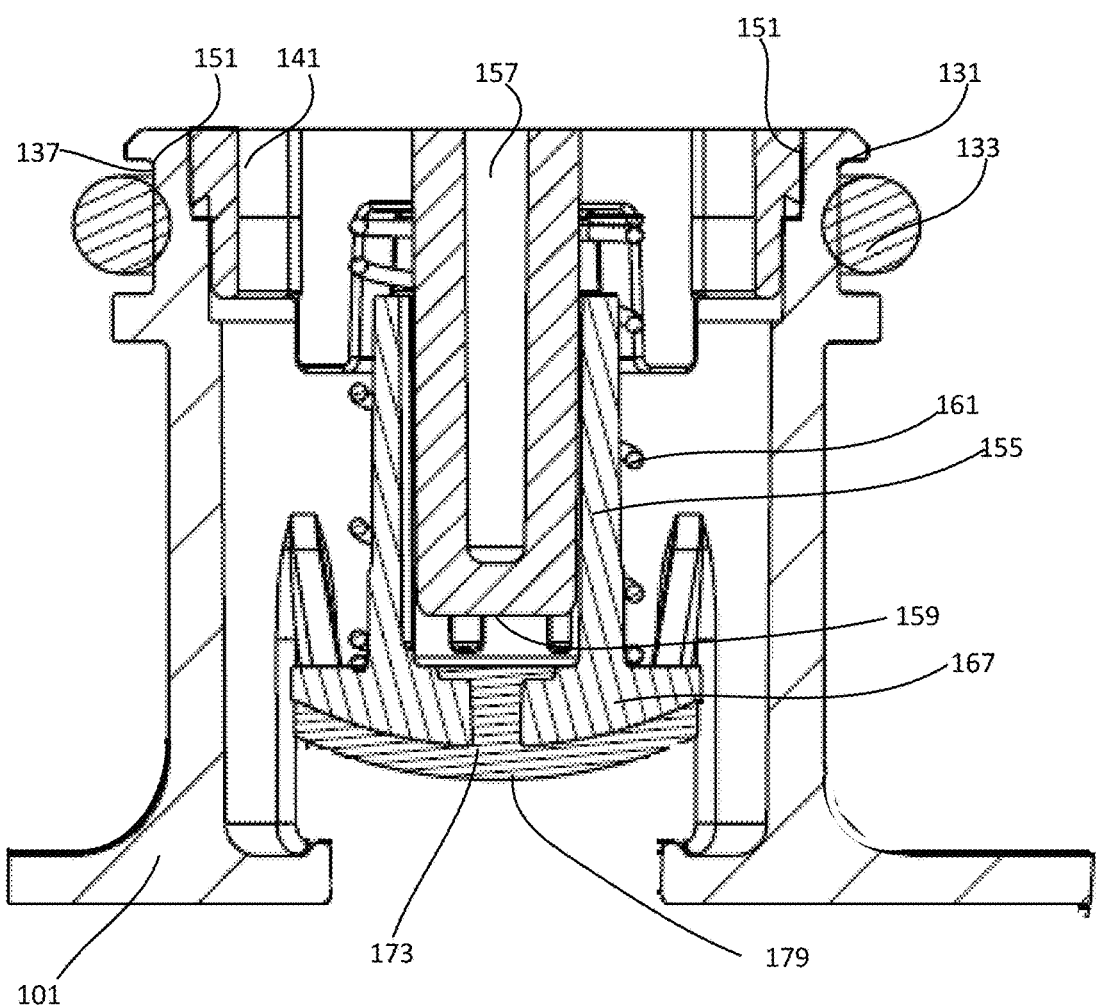
FIG. 3E is side cross-sectional diagram of the anti-drainback valve of the embodiments of FIGS. 3A-3C in an open state.

Fluid filter assembly 300 differs from the previously described assemblies in that it includes a flex tube assembly 125 that is integral with one of the illustrated outlets of the upper cover 101, namely the second outlet 115. Consequently, all or a portion of the sidewall of the second outlet 115 is utilized as the flex tube body of the integral flex tube assembly. That concept is best shown in FIG. 3E, which illustrates a sidewall of the second outlet 115 as serving as the flex tube body 125. Similar configurations may be used in instances where the flex tube body I integral with the first outlet 113.

Fluid filter assembly also differs from the previously described assemblies in that the integral flex tube assembly does not include a lower sealing member 133 for joining the flex tube assembly to the upper cover 101. This is because the sidewall/flex tube body 125 of the assembly 300 is integral (i.e., unitary) with the upper cover 101 (as best shown in FIGS. 3D-3E), such that the sidewall/flextube body 125 is substantially inseparable from the upper cover 101. In that context, "substantially inseparable from the upper cover" means that the sidewall/flex tube body 125 is not removably coupled to the upper cover 101, and may not be separated from the upper cover without cutting or breaking the sidewall/flex tube body 125 from the upper cover.

It is also noted that FIGS. 3A-3E depict an example of a dual outlet fluid filter assembly that includes an integral flex tube assembly, wherein sidewall/flex tube body 125 is made of the same material as the upper cover 101. Such a configuration is not required, and the sidewall/flex tube body 125 may be made of any suitable material. In embodiments, for example, a proximal portion of the sidewall/flex tube body 125 located proximate to the upper cover 101 is made from a first material and a distal potion of the sidewall/flex tube body 125 located distal from the upper cover 101 is made from a second material, wherein the first and second materials are the same as or different from one another. In embodiments, the first and second materials are different from one another. For example, in embodiments the second material is more flexible than the first material. In embodiments, the first material is the same material as the material forming upper cover 101, the second material differs from the first material, and the second material is more flexible than the first material.

EXAMPLES

The following examples recite additional embodiments of the present disclosure.

Example 1: According to this example there is provided a flex tube assembly including: a flex tube body having a proximal opening, a distal opening, and a valve sealing surface; an anti-drainback valve assembly disposed within a cavity of the flex tube body, the anti-drainback valve assembly including a cap, a biasing member, a piston, and a valve seat; wherein: the piston includes a piston cavity including a bottom the anti-drainback valve assembly is movable between an open state and a closed state; at least a portion of the cap is disposed within the piston cavity in the closed state, the biasing member urges the piston against the valve seat, so as to cause at least a portion of the valve seat to engage the valve sealing surface; and in the open state, the bottom of the cavity contacts at least a portion of the cap.

Example 2: This example includes any or all of the features of example 1, wherein: the flex tube body includes an outer surface including an outer groove; the flex tube assembly further includes a sealing member configured to seat within the outer groove and to compress against the outer surface when the flex tube assembly is installed within an outlet of a fluid filter system.

Example 3: This example includes any or all of the features of example 1, wherein: in the closed state, the valve seat and valve sealing surface form a fluid impermeable seal that prevents a flow of fluid through the flex tube assembly; the flex tube assembly is movable within a range of motion about an axis extending through the flex tube assembly, while maintaining the fluid impermeable seal.

Example 4: This example includes any or all of the features of example 1, wherein the piston is coupled to the valve seat.

Example 5: This example includes any or all of the features of example 4, wherein: the valve seat includes a protuberance defining a notch; and the piston includes a piston flange; and at least a portion of the piston flange is disposed within the notch, so as to couple the valve seat to the piston.

Example 6: This example includes any or all of the features of example 1, wherein the cap includes a cap body and a stem, the cap body including a circumferential surface that abuts a cap abutment surface of the flex tube body proximate the distal opening.

Example 7: This example includes any or all of the features of example 6, wherein: the piston includes a piston upper body defining the piston cavity; at least a portion of the stem is disposed within the piston cavity; the stem includes a sidewall and a stopping surface; in the open position, the stopping surface abuts a bottom of the piston cavity; and in the closed position, the stopping surface is positioned away from the bottom of the piston cavity, so as to define a gap between the bottom of the piston cavity and the stopping surface.

Example 8: This example includes any or all of the features of example 6, wherein: the cap includes a cap body inside of the circumferential surface, the cap body including an upper surface and a lower surface; and at least one opening extends through the cap body from the upper surface to the lower surface.

Example 9: This example includes any or all of the features of example 7, wherein at least part of the biasing member is disposed around the piston upper body.

Example 10: This example includes any or all of the features of example 6, wherein the stem includes a sidewall with at least one opening extending therethrough.

Example 11: According to this example there is provided a dual pump fluid filter apparatus, including: an upper cover including a first outlet and a second outlet; a lower cover coupled to the upper cover to define a cavity, the lower cover including an inlet; a filter medium disposed within the cavity; and a flex tube assembly in fluid communication with the first outlet, the second outlet, or both the first outlet and the second outlet, the flex tube assembly including: flex tube body having a proximal opening, a distal opening, and a valve sealing surface; an anti-drainback valve assembly disposed within a cavity of the flex tube body, the anti-drainback valve assembly including a cap, a biasing member, a piston, and a valve seat; wherein: the piston includes a piston cavity including a bottom; the anti-drainback valve assembly is movable between an open state and a closed state; at least a portion of the cap is disposed within the piston cavity; in the closed state, the biasing member urges the piston against the valve seat, so as to cause at least a portion of the valve seat to engage the valve sealing surface; and in the open state, the bottom of the cavity contacts at least a portion of the cap.

Example 12: This example includes any or all of the features of example 11, wherein: the flex tube body includes an outer surface including an outer groove; the flex tube assembly further includes a sealing member configured to seat within the outer groove and to compress against the outer surface when the flex tube assembly is installed within an outlet of a fluid filter system.

Example 13: This example includes any or all of the features of example 11, wherein: in the closed state, the valve seat and valve sealing surface form a fluid impermeable seal that prevents a flow of fluid through the flex tube assembly; the flex tube assembly is movable within a range of motion about an axis extending through the flex tube assembly, while maintaining the fluid impermeable seal.

Example 14: This example includes any or all of the features of example 11, wherein the piston is coupled to the valve seat.

Example 15: This example includes any or all of the features of example 14, wherein: the valve seat includes a protuberance defining a notch; and the piston includes a piston flange; and at least a portion of the piston flange is disposed within the notch, so as to couple the valve seat to the piston.

Example 16: This example includes any or all of the features of example 11, wherein the cap includes a cap body and a stem, the cap body including a circumferential surface that abuts a cap abutment surface of the flex tube body proximate the distal opening.

Example 17: This example includes any or all of the features of example 16, wherein: the piston includes a piston upper body defining the piston cavity; at least a portion of the stem is disposed within the piston cavity; the stem includes a sidewall and a stopping surface; in the open position, the stopping surface abuts a bottom of the piston cavity; and in the closed position, the stopping surface is positioned away from the bottom of the piston cavity, so as to define a gap between the bottom of the piston cavity and the stopping surface.

Example 18: This example includes any or all of the features of example 16, wherein: the cap includes a cap body inside of the circumferential surface, the cap body including an upper surface and a lower surface; and at least one opening extends through the cap body from the upper surface to the lower surface.

Example 19: This example includes any or all of the features of example 11, wherein the flex tube assembly is integral with the first outlet or the second outlet.

Example 20: This example includes any or all of the features of example 11, wherein the flex tube assembly is coupled to the first outlet or the second outlet.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A flex tube assembly comprising:
a flex tube body having a proximal opening, a distal opening, and a valve sealing surface;
an anti-drainback valve assembly disposed within a cavity of the flex tube body, the anti-drainback valve assembly comprising a cap, a biasing member, a piston comprising a piston flange, and a valve seat, wherein the valve seat is a monolithic part that includes a protuberance;
wherein:
the piston comprises a piston cavity comprising a bottom;
the anti-drainback valve assembly is movable between an open state and a closed state;
at least a portion of the cap is disposed within the piston cavity
in the closed state, the biasing member urges the piston against the valve seat, causing at least a portion of the valve seat to engage said valve sealing surface; and
in the open state, the bottom of the piston cavity contacts at least a portion of the cap;
the piston flange comprises a notch defining an opening through a thickness of the piston flange; and
the protuberance extends through the opening defined by the notch to couple the valve seat to the piston.

2. The flex tube assembly of claim 1, wherein:
the flex tube body comprises an outer surface comprising an outer groove;
the flex tube assembly further comprises a sealing member configured to seat within the outer groove and to compress against the outer surface when the flex tube assembly is installed within an outlet of a fluid filter system.

3. The flex tube assembly of claim 1, wherein:
in the closed state, the valve seat and valve sealing surface form a fluid impermeable seal that prevents a flow of fluid through the flex tube assembly;
the flex tube body is resiliently flexible such that it is movable within a range of motion about an axis extending through the flex tube assembly while the fluid impermeable seal is maintained.

4. The flex tube assembly of claim 1, wherein the cap comprises a cap body and a stem, the cap body comprising a circumferential surface that abuts a cap abutment surface of the flex tube body proximate said distal opening.

5. The flex tube assembly of claim 4, wherein:
the piston comprises a piston upper body defining the piston cavity;
at least a portion of said stem is disposed within the piston cavity;
said stem comprises a sidewall and a stopping surface;
in the open position, the stopping surface abuts a bottom of the piston cavity; and
in the closed position, the stopping surface is positioned away from the bottom of the piston cavity, so as to define a gap between the bottom of the piston cavity and the stopping surface.

6. The flex tube of claim 4, wherein:
the cap comprises a cap body inside of the circumferential surface, the cap body comprising an upper surface and a lower surface; and
at least one opening extends through the cap body from the upper surface to the lower surface.

7. The flex tube of claim 5, wherein at least part of the biasing member is disposed around the piston upper body.

8. The flex tube of claim 4, wherein the stem comprises a sidewall with at least one opening extending therethrough.

9. A dual pump fluid filter apparatus, comprising:
an upper cover comprising a first outlet and a second outlet;
a lower cover coupled to the upper cover to define a cavity, the lower cover comprising an inlet;
a filter medium disposed within the cavity; and
a flex tube assembly in fluid communication with to the first outlet, the second outlet, or both the first outlet and the second outlet, the flex tube assembly comprising:
a flex tube body having a proximal opening, a distal opening, and a valve sealing surface;
an anti-drainback valve assembly disposed within a cavity of the flex tube body, the anti-drainback valve assembly comprising a cap, a biasing member, a piston comprising a piston flange, and a valve seat;
wherein:
the valve seat is a monolithic part that includes a protuberance;
the piston comprises a piston cavity comprising a bottom;
the anti-drainback valve assembly is movable between an open state and a closed state;
at least a portion of the cap is disposed within the piston cavity
in the closed state, the biasing member urges the piston against the valve seat, causing at least a portion of the valve seat to engage said valve sealing surface;
in the open state, the bottom of the piston cavity contacts at least a portion of the cap;
the piston flange comprises a notch that defines an opening through a thickness of the piston flange; and
the protuberance extends through the opening defined by the notch to couple the valve seat to the piston.

10. The dual pump fluid filter apparatus of claim 9, wherein:
the flex tube body comprises an outer surface comprising an outer groove;
the flex tube assembly further comprises a sealing member configured to seat within the outer groove and to compress against the outer surface when the flex tube assembly is installed within an outlet of a fluid filter system.

11. The dual pump fluid filter apparatus of claim 9, wherein:
in the closed state, the valve seat and valve sealing surface form a fluid impermeable seal that prevents a flow of fluid through the flex tube assembly;
the flex tube body is resiliently flexible such that it is movable within a range of motion about an axis extending through the flex tube assembly while the fluid impermeable seal is maintained.

12. The dual pump fluid filter apparatus of claim 9, wherein the cap comprises a cap body and a stem, the cap body comprising a circumferential surface that abuts a cap abutment surface of the flex tube body proximate said distal opening.

13. The dual pump fluid filter apparatus of claim 12, wherein:
the piston comprises a piston upper body defining the piston cavity;
at least a portion of said stem is disposed within the piston cavity;
said stem comprises a sidewall and a stopping surface;
in the open position, the stopping surface abuts a bottom of the piston cavity; and in the closed position, the stopping surface is positioned away from the bottom of the piston cavity, so as to define a gap between the bottom of the piston cavity and the stopping surface.

14. The dual pump fluid filter apparatus of claim 12, wherein:
the cap comprises a cap body inside of the circumferential surface, the cap body comprising an upper surface and a lower surface; and
at least one opening extends through the cap body from the upper surface to the lower surface.

15. The dual pump fluid filter apparatus of claim 9, wherein the flex tube assembly is integral with the first outlet or the second outlet.

16. The dual pump fluid filter apparatus of claim 9, wherein the flex tube assembly is coupled to the first outlet or the second outlet.

* * * * *